(12) United States Patent
Fujii et al.

(10) Patent No.: US 7,375,917 B1
(45) Date of Patent: May 20, 2008

(54) IDLE SEEK CALIBRATION METHOD FOR MAGNETIC DISK DRIVE AND MAGNETIC DISK DRIVE WITH AN INTERMISSION CALIBRATION

(75) Inventors: Yoshikatsu Fujii, Atsugi (JP); Tsuyoshi Arai, Odawara (JP); Toshiyuki Kikuta, Odawara (JP); Takao Horiguchi, Odawara (JP); Shinji Matsushita, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/517,176

(22) Filed: Mar. 2, 2000

(30) Foreign Application Priority Data

Aug. 31, 1999 (JP) .......................................... 11-244605

(51) Int. Cl.
*G11B 5/55* (2006.01)

(52) U.S. Cl. ................. 360/78.08; 360/78.04; 360/78.06
(58) Field of Classification Search ............... 360/78.04, 360/75, 78.06, 78.08, 78.12, 78.09
See application file for complete search history.

(56) References Cited

U.S. PATENT DOCUMENTS

| 5,606,470 | A |   | 2/1997 | Shioya et al. ............ 360/78.04 |
| 5,844,743 | A | * | 12/1998 | Funches ................... 360/78.04 |
| 5,863,237 | A | * | 1/1999 | Felts et al. ..................... 451/41 |
| 6,239,935 | B1 | * | 5/2001 | Shrinkle ....................... 360/75 |

FOREIGN PATENT DOCUMENTS

| EP | 0673032 | 9/1995 |
| JP | 7-182807 | 7/1995 |
| JP | 7-262539 | 10/1995 |

OTHER PUBLICATIONS

Masaki "Optimum Idle Seek in Data Servo Control of Magnetic Storage," English Abstract of JP7-182807, Jul. 1995.

Yugi et al., "Magnetic Recording and Reproducing Apparatus and Control Method Thereof," English Abstract of EP673032, Sep. 1995.

* cited by examiner

*Primary Examiner*—David Hudspeth
*Assistant Examiner*—James L Habermehl
(74) *Attorney, Agent, or Firm*—Antonelli, Terry, Stout & Kraus, LLP

(57) ABSTRACT

When an idle seek operation of a magnetic disk drive is executed under a velocity control utilizing a back electromotive force of a VCM actuator, the accuracy of the velocity control is deteriorated due to temperature variation of the VCM. To eliminate this disadvantage, a calibration of the velocity control is executed by using control information, such as a track number read from the magnetic disk medium. After the velocity control has been executed for an appointed period, by detecting the back electromotive force from the VCM actuator, an MR sense current and a power of a read write LSI are turned on for a time, positioning information on the magnetic disk medium is read out, parameters to be used for the velocity control are calibrated, and thus a stability of the control can be obtained. Hereby, because the positioning information on the magnetic disk medium is not used constantly, the power consumption during the idle seek operation is reduced, and a stable control of the movement can be obtained as well. For a portable system such as a notebook type personal computer in which a magnetic disk drive is employed, the operation is improved with respect to the use of a battery.

8 Claims, 5 Drawing Sheets

IDLE SEEK CALIBRATION METHOD FOR MAGNETIC DISK DRIVE AND MAGNETIC DISK DRIVE WITH AN INTERMISSION CALIBRATION

FIELD OF THE INVENTION

The present invention is related mainly to technology for reducing power consumption in a magnetic disk drive. Especially, the present invention is related to a method of performing an idle seek operation of an actuator carrying magnetic heads, and to a magnetic disk drive which employs this method.

BACKGROUND OF THE INVENTION

When data or control signals are issued to a magnetic disk drive from a host unit which controls output/input of data, the magnetic disk drive moves an actuator carrying magnetic heads toward one of plural tracks which are formed in concentric circles around a rotating axis of a magnetic disk medium (seek operation), and positions the actuator on a target track (following operation). Next the disk drive writes data on an appointed area (sector) in the target track or reads out data from the appointed area. Herein, each track has plural fan formed recording areas and each of these areas is typically called a sector.

On the other hand, when data or control signals have not been issued to a magnetic disk drive from a host unit, namely, when there is no access operation, and the magnetic disk drive does not work as an external storage device, an idle seek operation is executed in consideration of data reliability. In this regard, an idle seek operation is an operation wherein, when no access is ordered by the host unit, an actuator is moved in a radial direction on a rotating magnetic disk medium.

When a head follows a constant track area on a magnetic disk medium continuously for a long time, it is possible that the magnetic head will crash or come into a physical contact with the track area, whereby data written on the track area may be lost. The main purpose of the idle seek operation is to prevent data loss caused by this problem, although the idle seek operation provides an additional effect, such as to remove dust stuck to magnetic heads.

Certain features concerning the idle seek operation have been disclosed. For example, Japanese patent unexamined publication 07-182807 indicates that an idle seek operation is executed under servo control utilizing standard positioning information on the magnetic disk medium for the purpose of reducing the influence of a mechanical displacement caused by a lapse of time. In this method, it is necessary always that an electronic circuit (read-write circuit) is powered up to read out the servo information from the magnetic disk medium, and sense current is provided to an MR head, which is a magnetic head for reading out data.

In the conventional idle seek operation, as described above, which is executed under servo control utilizing the positioning information on the magnetic disk medium, it is necessary that an electronic circuit for reading the information is powered up at all times to use the positioning information recorded on the magnetic disk medium. Thus, it is difficult to reduce power consumption of the electronic circuit. Further, to drive an MR head having a magneto-resistive effect element, a sense current has to be supplied to the magneto-resistive effect element; therefore, this not only prevents the MR head from having a long life, but increases power consumption as well.

An increase of the power consumption causes an increase of the battery capacity in a portable system, such as a notebook personal computer, etc., which carries a magnetic disk drive, and a power saving of the magnetic disk drive is required by the portable host system.

An idle seek method, in which the positioning information on the magnetic disk medium is not utilized, is disclosed in Japanese patent unexamined publication 07-262539. In this publication, an idle seek method is disclosed in which an actuator is moved under velocity control utilizing voltage generated by the back electromotive force (hereinafter referred to as back electromotive force) in a voice coil motor (VCM) without using the servo information from the magnetic disk medium, namely without providing the sense current to an MR head and without reading out the positioning information on the magnetic disk medium.

However, in this conventional technology, the actuator is moved so that the back electromotive force is balanced with a voltage-supplied to the VCM; namely, this operation is based on an open loop control by a kind of analog circuit in the form of hardware. Actually, we, the inventors of the present invention, found that, because the back electromotive force was affected and varied by a variation of VCM temperature, accurate control of the idle seek operation could not be achieved, and so the idle seek operation according to this conventional technology did not have sufficient reliability.

At the moment of start of an idle seek operation, the temperature of a coil in the VCM is relatively high, and, as the coil is cooled gradually, the back electro-motive force is affected and varied, so that accurate velocity control can not be attained. Accordingly, the back electromotive force has to be calibrated adequately by the control information read out from the magnetic disk medium.

SUMMARY OF THE INVENTION

In a magnetic disk drive having a processing unit which controls the magnetic disk drive, an MR head which reads information on a magnetic disk medium, a read-write IC which has operates to amplify the information read from the magnetic disk medium and to turn on/off sense current to the MR head, and an electronic circuit which operates to detect a back electromotive force from a VCM actuator and to convert an analog value of the back electro-motive force detected to a digital value, and has a read-write channel to transfer the amplified readout information signal the processing unit, velocity control utilizing the back electromotive force from the VCM actuator is calibrated soon after a start of the idle seek operation, which is executed under conditions in which the sense current is shut off and the read-write IC and the read-write channel are powered out.

Namely, the calibration is executed as follows: the sense current is turned on, the read-write IC and the read-write channel are powered up, and the information on the magnetic disk medium is read out. This calibration is executed regularly or irregularly. Further, the processing unit has a function by which an accurate positioning of the magnetic head on the magnetic disk medium can be attained.

BRIEF DESCRIPTION OF THE DRAWINGS

FIG. 3 is a flow chart showing the procedure for calibration of various parameters for velocity control, in which the sense current is provided to the MR head, an RW system LSI is powered up, and a track number is taken in.

DESCRIPTION OF THE PREFERRED EMBODIMENTS

Figure 5:
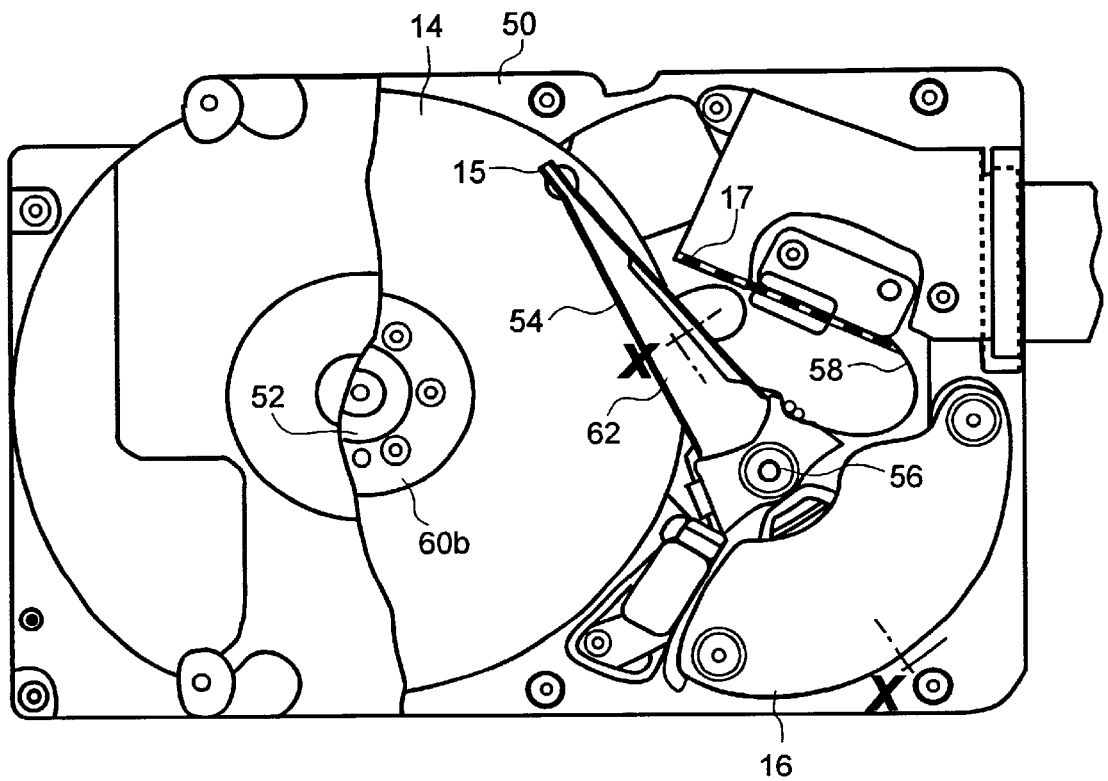
FIG. 5 is a top plan view, partially cut away, of a magnetic disk drive to which the present invention is applied.
Figure 6:
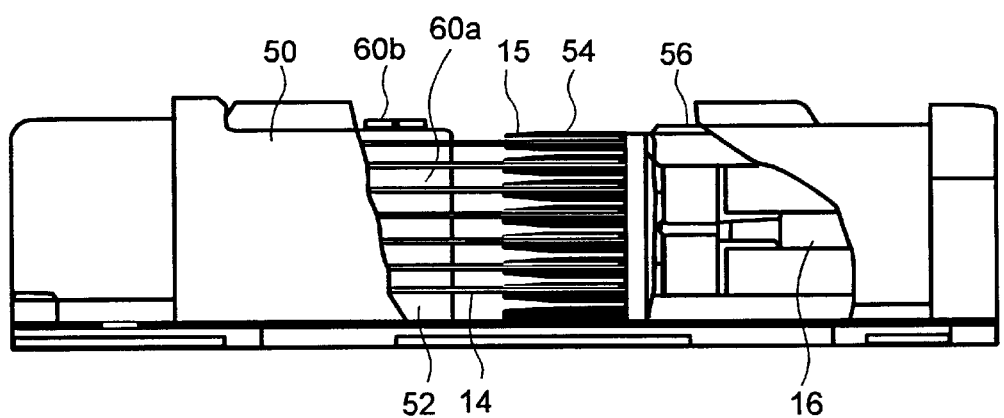
FIG. 6 is a side view of a magnetic disk drive to which the present invention is applied.

First, a magnetic disk drive, to which the present invention is applied, will be explained with reference to FIG. 5 and FIG. 6. The magnetic disk drive comprises a sealed enclosure 50 (FIG. 5), disks 14 which constitute a magnetic recording media, a spindle motor 52 which supports and rotates the disks 14, head assemblies 54 which respectively comprise suspension arms and magnetic heads to read out information from the disk 14, a swing arm including a pivot shaft 56 which supports the head assemblies 54 and swings the head assemblies on the disks, a voice coil motor 16 which drives the swing arm, a control circuit board 17 which makes the magnetic head write to the disk 14 and read from the disk 14, a controller (not shown in the Figs.) which controls movements of the spindle motor 52 and the voice coil motor 16, and a printed wiring board 58 which connects these elements electrically.

The disks 14, the spindle motor 52, the head assemblies 54, a part of the printed wiring board 58, and the voice coil motor 16 are disposed inside of the enclosure 50 and are sealed by the enclosure 50. The spindle motor 52 is an in-hub type motor in which a hub to fix the disks is placed at the outermost and a rotor and a stator are built in the hub, and the motor is mounted on a base plate of the enclosure 50. The disk 14 is an important component which determines the data storage capacity of the magnetic disk drive. Usually, the drive provides one disk or several disks corresponding to a given storage capacity. In the magnetic disk drive according to the present invention, the disks 14 and disk spacers 60a (FIG. 6) are inserted alternately on the hub. A disk clamp 60b fixes the disks 14 on the spindle motor 52 by clamping a stack of the disks in the axial direction of the spindle motor 52.

The disk drive has several swing arms corresponding to the number of disks 14. Each swing arm comprises sliders 15, which carry a magnetic head, and the suspension arms 62. The swing arm is fixed to the base plate through the pivot shaft 56 so as to rotate freely. A dual head, which is a combination of a thin film head for writing and a magneto resistive effect type head for reading, is employed as the magnetic head and is built in each slider 15. Further, as the magnetic head, an inductive head, a thin film head, a MIG head, a GMR head, and a TMR head can be employed.

In the magnetic disk drive to which the present invention is applied, a rotary actuator and a positioning method using servo information on a data surface of the disk are employed, and each track has servo information which is readable periodically. The servo information is written at a location to which an MR head is positioned during writing by the inductive head (not shown in Fig.).

Next, an embodiment of the present invention will be explained with reference to the drawings.

Figure 1:
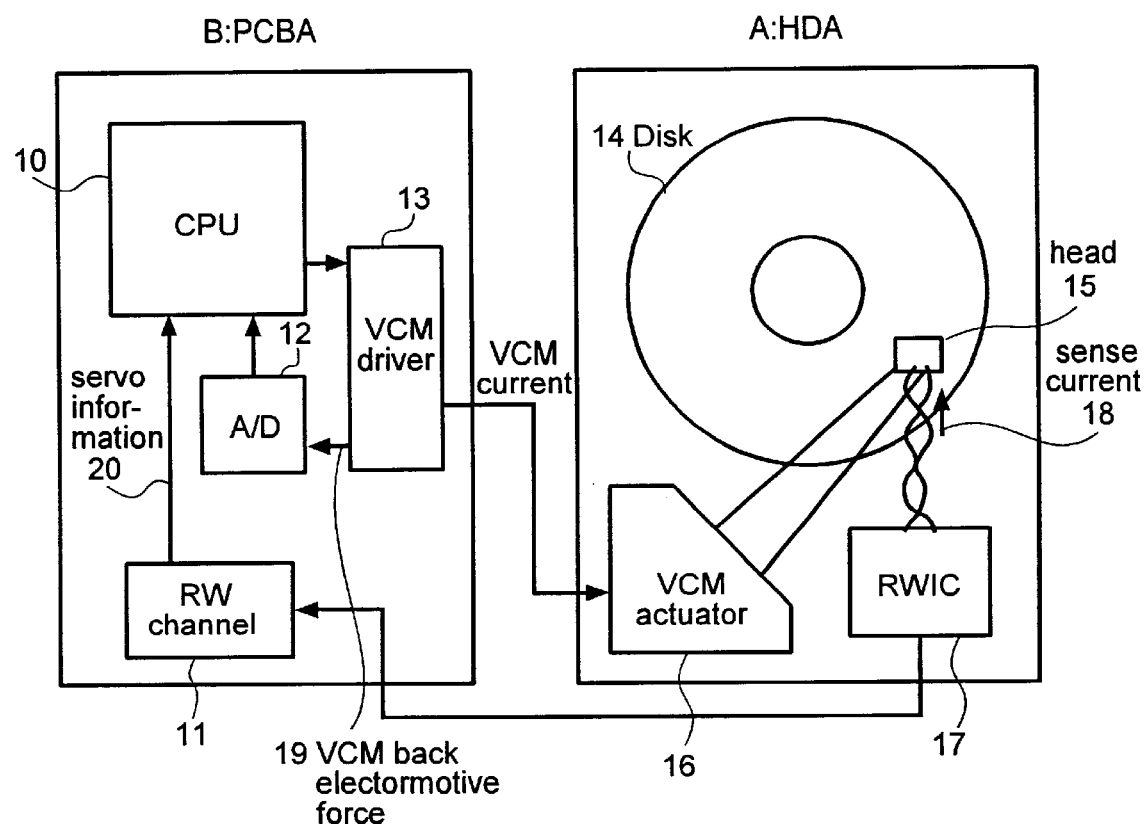
FIG. 1 is a block-diagram of a magnetic disk drive according to the present invention.

FIG. 1 is a block diagram of a magnetic disk drive, in which only those parts necessary to an understanding of the present invention are illustrated. The magnetic disk drive comprises a head-disk assembly (HDA) and a printed circuit board assembly (PCBA).

A CPU 10 is a processing unit which controls the magnetic disk drive according to a control program. The PCBA comprises the CPU 10 and a combination of other electronic circuits. A servo control is executed by using positioning information recorded on the disk 14. Namely, the position signal to be used in the servo control is read out by providing a sense current 18 to the magnetic head 15. A small read out signal from the magnetic head 15 is amplified by a read-write IC 17 (RW IC 17), is restored to servo information 20 by a read-write channel 11 (RW channel 11), and is taken in the CPU11.

On the basis of the servo information 20, the CPU 10 sends control information to a VCM driver 13. The VCM driver 13 converts this information to a VCM drive current and sends the current to a VCM actuator 16, which then drives the magnetic head 15.

By detecting a voltage generated by a back electromotive force in the VCM actuator 16 (hereinafter the voltage is referred to as a back electromotive force), the following velocity control is executed. Namely, the back electromotive force 19, which is generated due to a movement of the VCM actuator, is detected with a detecting circuit built in the VCM driver 13, and the back electro-motive force is output as a voltage signal (VCM back electro-motive force). An electronic circuit, which has a function similar to that described above, may be disposed outside of the VCM driver 13.

The VCM back electromotive force is digitized through an analog to digital converter 12 (A/D converter) and the digitized information is taken in the CPU 10 as velocity information. Based on the velocity information, the magnetic head 15 is moved in a way similar to the servo control process. Here, the electronic circuits (LSI) in the RW channel 11 and the RW IC 17 are not used, so the power consumed in these chips is saved.

Figure 2:
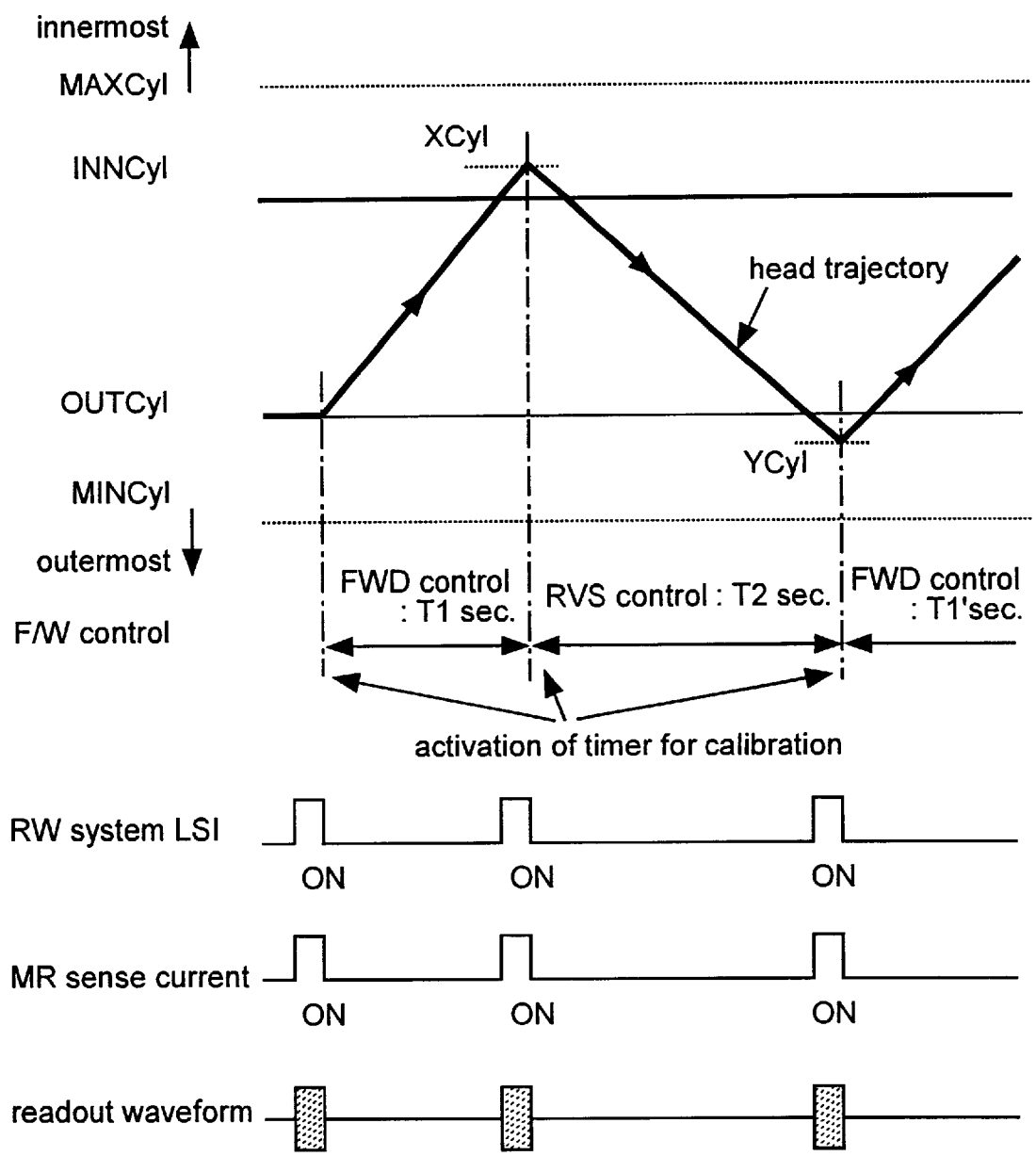
FIG. 2 is a diagram showing the concept of the idle seek operation in accordance with the present invention.

The concept of the idle seek operation in accordance with the present invention is shown in FIG. 2. This drawing is a time chart on which the vertical axis shows a distance of the head movement when the magnetic head moves on the magnetic disk medium in the radius direction (the upper side is the innermost side), and the horizontal axis shows time. The vertical axis is graduated in track number and a trajectory of the magnetic head moved under the velocity control (F/W) is shown together with arrows in the drawing.

Further, periods T1, T2, and T1' (values to be set in the timer) in which the velocity control F/W is executed, and ON timings at which the read-write IC 17 (RW IC) and the read-write channel 11 (hereinafter these circuits 17 and 11 are referred to as the RW system LSI) are powered up and the sense current is provided to the MR head, are shown also in the drawing. At each of these ON timings, a calibration of various parameters, a resetting of a timer, and activation of the timer are executed.

First, at an OUTcyl position, the MR sense current is provided and the RW system LSI is powered up, and a present position (track number) is taken in from the magnetic head (MR head). Here, the designation Cyl is an abbreviation for a cylinder, which, as is conventionally known, represents an imaginary cylinder including tracks on which plural magnetic heads follow at the same time.

Next, the MR sense current is shut off, the RW system LSI is powered off, a timer of T1 seconds is activated, and the magnetic head is moved in the forward direction (direction from the outermost position to the innermost position of the magnetic disk medium) under the velocity control (F/W control) by utilizing the back electromotive force of the VCM actuator.

After T1 seconds have elapsed, the MR sense current and the RW system LSI are turned on again, and a track position at that time XCyl is taken in. T1 is dependent on the diameter of the magnetic disk medium, and it is usually from several seconds to 30 or 40 seconds. The period while the MR sense current is provided is very short in comparison with T1. Accordingly, though it appears in FIG. 2 that the RW system LSI is powered up before T1 seconds have elapsed, accuracy of these timings are not essential in the present invention.

After T1 seconds have elapsed, INN<X<MAX is desirable. Namely, if the track position of the magnetic head after T1 seconds is between INNCyl and MAXCyl, the seek direction is reversed and the magnetic head is moved from the innermost position to the outermost position as a next control step.

The MR sense current is shut off and the RW system LSI is powered off in the idle seek operation; therefore, when the power is turned on, it is necessary that the magnetic head (MR head) passes the location on the magnetic disk medium on which the servo information is recorded. For this reason, the above-mentioned cylinder range is provided beforehand and the condition for reversing the seek movement is eased.

Next, the MR sense current is shut off and the RW system LSI is powered off, a timer of T2 seconds is activated, and the magnetic head is moved in the reverse direction (RVS direction; direction from the innermost position to the outermost position of the magnetic disk medium) under the velocity control by utilizing the back electromotive force of the VCM actuator. After T2 seconds have elapsed, the MR sense current and the RW system LSI are turned on and a track position at that time YCyl is taken in. At this time, MIN<Y<OUT is desirable. Namely, if the track position of the magnetic head is between MINCyl and OUTCyl after T2 seconds, the seek direction is reversed and the magnetic head is moved from the outermost position to the innermost position as a next control step.

Then, the MR sense current and the RW system LSI are turned off, a timer of T1' seconds is activated, and the magnetic head is moved in the FWD direction again under the velocity control by utilizing the back electromotive force of the VCM actuator.

By repetition of the above-mentioned sequence, the idle seek process of the present invention can be executed continuously. The time chart in FIG. 2 shows the basic concept of the idle seek operation according to the present invention. Here, X and Y are the Cyl positions at which the magnetic head has arrived as a result of the velocity control for the appointed periods (T1, T2, and T1') determined by timers without using the position information which has been used in conventional technologies. Accordingly, the arrival Cyl must be in a range of some breadth. Therefore, it is necessary that control parameters are determined so that the track position, as a result of the idle seek operation, can not be outside of the outermost track or inside of the innermost track on the magnetic disk medium.

In an actual drive, the calibration is executed several times in each period of T1, T2, T1', so that more accurate velocity control is obtained. The time T1, T2, T1' needed for the movement in one direction is about 10 seconds. In this case, if X=7700 Cyl and Y=100 Cyl, a distance of the movement X−Y is about 7 mm, and the velocity of the idle seek operation is about 0.7 mm/s. It is allowable if X, Y is in the range of 500 Cyl, namely INNCyl (7500 Cyl)<X<MAXCyl (8000 Cyl, the outermost)

MINCyl (0 Cyl, the innermost)<Y<OUTCyl (500 Cyl)

are allowed.

Further, though the above-mentioned allowable range for X, Y, is dependent on the accuracy of the velocity control by utilizing the back electromotive force of the VCM actuator, the range may be between about 150 Cyl and 300 Cyl, i.e. narrower than 500 Cyl, namely INNCyl (7850 Cyl)<X<MAXCyl (8000 Cyl, the outermost)

MINCyl (0 Cyl, the innermost)<Y<OUTCyl (150 Cyl)

may be allowable.

Figure 3:
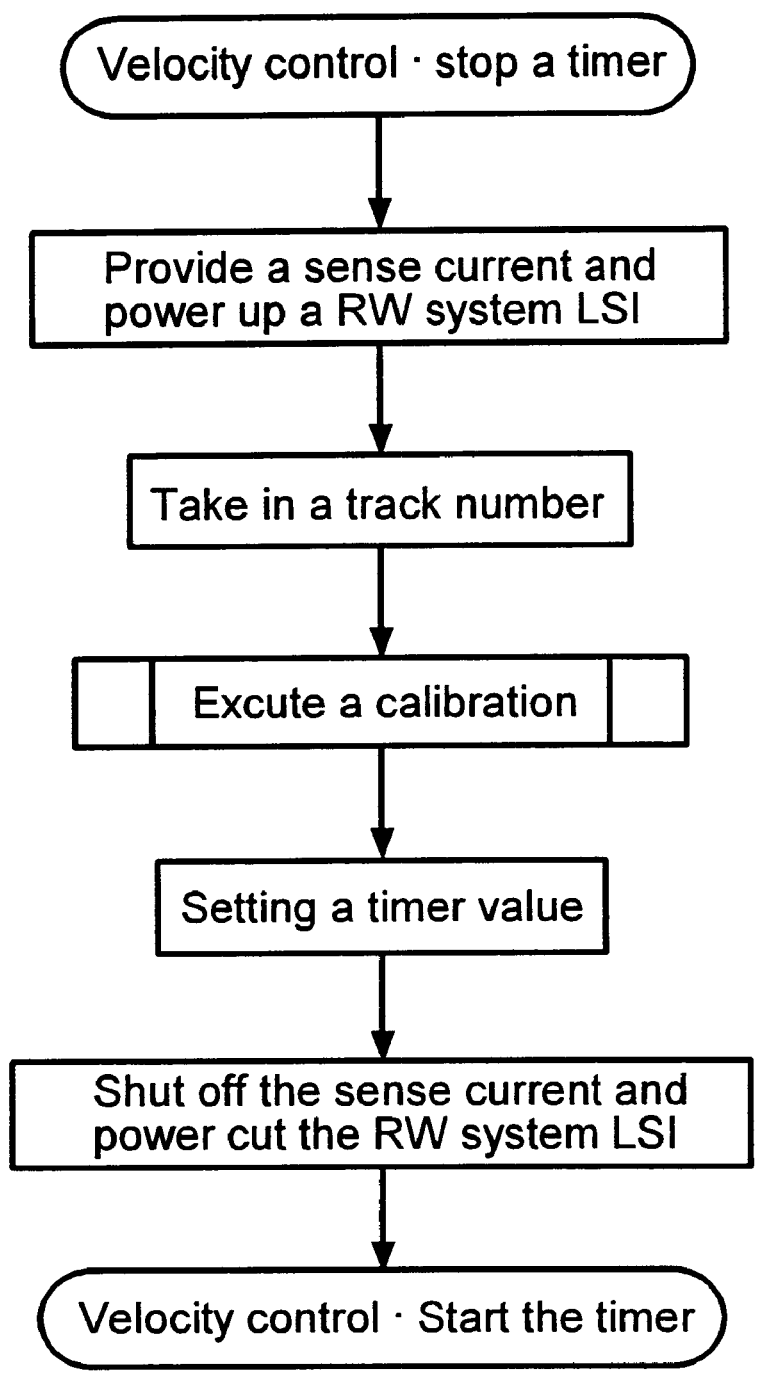

FIG. 3 is a flow chart showing the procedure for calibration of various parameters for the velocity control, in which the sense current is provided to the MR head, the RW system LSI is powered up, and a track number is taken in.

After an appointed time which was set in the timer has passed, first, the MR sense current and the RW system LSI are turned on. Next, a track number of a present position is read. Here, a distance of the movement in the period set in the timer is obtained from a difference between the present track number and the previous track number, and a velocity can be calculated by using this information. The calibration of parameters for the velocity control is executed based on this velocity.

At this time, a timer value for a next idle seek movement is also calculated and set to the timer. When the calculation of the timer value has been finished, the MR sense current and the RW system LSI is turned off again, the seek direction is reversed, and the velocity control is begun again.

Figure 4:
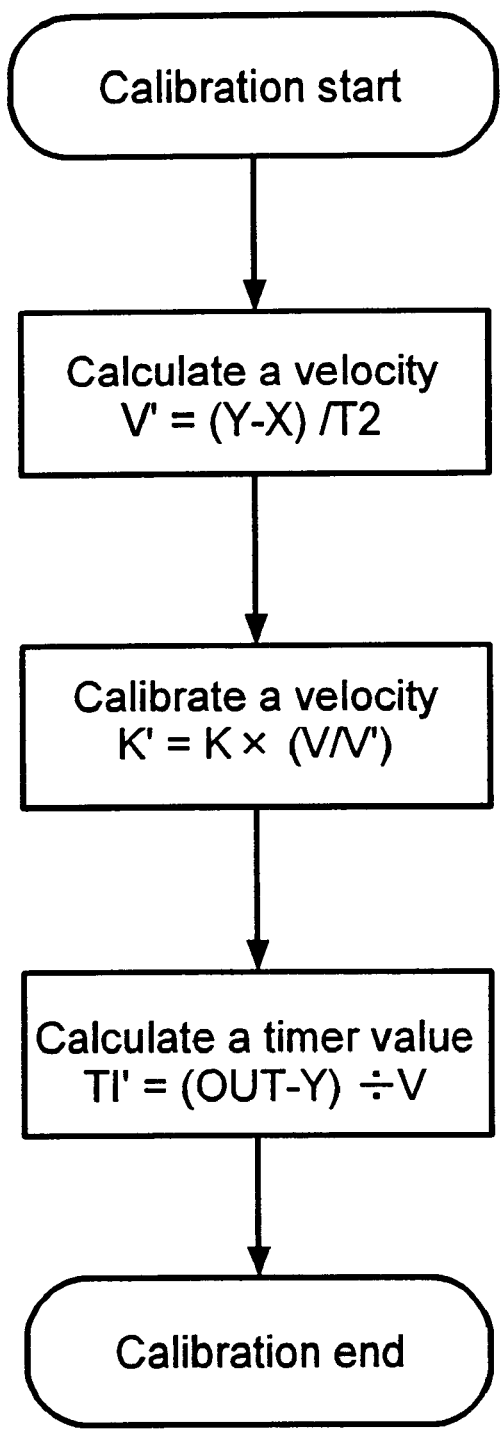
FIG. 4 is a flow chart showing a detailed procedure for the calibration of velocity and a timer value in accordance with the present invention.

FIG. 4 is a flow chart showing a detailed procedure for the calibration of a velocity value and a timer value. In the case shown in FIG. 4, a previous track number=X, a present track number=Y, a timer value=T2, a timer value to be set next= T1', a target velocity=V, a detected velocity=V', a present velocity detecting gain obtained from the back electromotive force of the VCM actuator=K, a next velocity detecting gain to be obtained next from the back electromotive force of the VCM actuator=K', and a target track number=OUT.

First, the velocity V' of the present movement is calculated by using X, Y, and T2. By this velocity information, the velocity detecting gain K' is determined so that the next velocity becomes equal to the target velocity V. Lastly, the timer value to execute the next velocity control is determined with the information of the present track number and the target track number.

Through the sequence of processes shown in FIG. 4, the calibration is achieved. It is essential to the present invention that, when the velocity control is executed by monitoring and utilizing the back electromotive force of the VCM in the idle seek operation which is executed after the MR sense current is shut off and the RW system LSI is powered off, the calibration of the velocity control is executed. Accordingly, this calibration does not necessarily need to be executed at each reversing of the seek direction. The calibration may be executed intensively soon after a start of the idle seek operation under the velocity control of the present invention, when temperature variation is particularly rapid. It is not essential to the present invention when the calibration of the idle seek operation under the velocity control is executed. However, it is necessary that the above-mentioned calibration and the seek control are executed before the magnetic head arrives outside of the outermost position or inside of the innermost position on the magnetic disk medium.

Further, in a conventional idle seek operation in which the positioning information is used constantly, current consumption is about 300 mA, for example, but current consumption in the idle seek operation of the present invention is about 200 mA and saving effect of 100 mA is obtained. This saved value is nearly equal to the sum of the MR head sense current and current consumption by the RW system LSI.

By the present invention, velocity control is executed by using the back electromotive force of the VCM actuator, except that the calibration of the velocity control is merely executed some times, and resources (power for circuits and life time of an MR head) of a magnetic disk drive are utilized efficiently. Therefore, the positioning information recorded on the magnetic disk medium is not used constantly, and a power saving can be achieved. Furthermore, although the supply of the sense current to the MR head is stopped in substance, an accurate and reliable idle seek operation can be obtained.

What is claimed is:

1. A control method for a magnetic disk drive having a processing unit controlling the magnetic disk drive, a magnetic head reading information on a magnetic disk medium, and an electronic circuit having a function to amplify said information read from said magnetic disk medium, a function to detect back electromotive force from a VCM actuator, a function to convert said back electromotive force detected as an analog value to a digital value, and a function to transfer said amplified readout information signal to said processing unit, the method comprising:

a first step of stopping the supply of electric power to the whole of or a part of said functions to amplify said information read from said magnetic disk medium and to transfer said amplified readout information signal to said processing unit;

a second step of moving said magnetic head by using said back electromotive force of said VCM actuator;

a third step of starting the supply of an electric power to the whole of or a part of said functions to amplify said information read from said magnetic disk medium and to transfer said amplified readout information signal to said processing unit;

a fourth step of again stopping the supply of an electric power to the whole of or a part of said functions to amplify said information read from said magnetic disk medium and to transfer said amplified readout information signal to said processing unit; and a fifth step of changing a direction of moving said magnetic head by using said back electromotive force of said VCM actuator.

2. The control method according to claim 1, further comprising between said third step and said fourth step, an additional step of amplifying said information read from said magnetic disk medium.

3. The control method according to claim 1, wherein the procedure from said starting the supply of an electric power to the whole of or a part of said functions to again stopping the supply of an electric power to the whole of or a part of said functions is repeated irregularly.

4. The control method according to claim 1, wherein the procedure from starting the supply of an electric power to the whole of or a part of said functions to again stopping the supply of an electric power to the whole of or a part of said functions is repeated according to a geometric series, an exponential function, or an elementary function, or is repeated with a period such that said seek velocity is kept at a constant value.

5. A control method for a magnetic disk drive having a processing unit which controls the magnetic disk drive, an MR head which reads information on a magnetic disk medium, a read-write IC which has a function to amplify the information read from the magnetic disk medium and a function to shut off a sense current to the MR head and to provide it to the MR head, and an electronic circuit which has a function to detect a back electromotive force from a VCM actuator, a function to convert the back electromotive force detected as an analog value to a digital value, and a read-write channel to transfer amplified information to the processing unit, the method comprising:

a first step of shutting off the sense current and stopping electric power in the whole of or a part of the read-write IC and the read-write channel;

a second step of moving the MR head by using a back electromotive force of the VCM actuator;

a third step of providing the sense current and supplying electric power to the whole of or the part of the read-write IC and the read-write channel;

a fourth step of amplifying information read from the magnetic disk medium;

a fifth step of shutting off the sense current and stopping electric power in the whole of or the part of the read-write IC and the read-write channel; and a sixth step of moving the MR head in an opposite direction to the previous direction by using the back electromotive force of the VCM actuator.

6. A magnetic disk drive, comprising:

a processing unit which controls the magnetic disk drive;

a magnetic head which reads information on a magnetic disk medium; and an electronic circuit which has a function to amplify information read from the magnetic disk medium, a function to detect a back electromotive force as an analog value from a VCM actuator, a function to convert the back electromotive force detected as an analog value to a digital value, and a function to transfer the amplified information to the processing unit;

wherein the magnetic disk drive has:

a function to execute an idle seek operation by using the back electromotive force of the VCM actuator without amplifying the information read from the magnetic disk medium, and a function to amplify, after the idle seek operation, the information read from the magnetic disk medium, to obtain information concerning the position of the magnetic head, and then to change the direction of the idle seek operation.

7. A magnetic disk drive, comprising:

a processing unit which controls the magnetic disk drive;

a magnetic disk medium;

a magnetic head which reads information on the magnetic disk medium; and an electronic circuit which has a function to amplify information read from the magnetic disk medium, a function to detect back electromotive force as an analog value from a VCM actuator, a function to convert the back electromotive force detected as an analog value to a digital value, and a function to transfer the amplified information to the processing unit;

wherein the processing unit can set a target velocity, the magnetic disk drive executes an idle seek operation by using the back electromotive force of the VCM actuator without amplifying the information read from the magnetic disk medium, and has a function to amplify, after the idle seek operation, the information read from the magnetic disk medium, to obtain information concerning the position of the magnetic head, and then to calibrate a velocity of said idle seek position.

8. A magnetic disk drive, comprising:

a processing unit which controls the magnetic disk drive;

a magnetic disk medium;

a magnetic head which reads information on the magnetic disk medium; and an electronic circuit which has a function to amplify information read from the magnetic disk medium, a function to detect back electromotive force as an analog value from a VCM actuator, a function to convert the back electromotive force detected as an analog value to a digital value, and a function to transfer the amplified information to the processing unit;

wherein the magnetic disk drive executes an idle seek operation by using the back electromotive force of the VCM actuator without amplifying the information read from the magnetic disk medium; and if the magnetic disk medium has 8000 cylinders, then a direction of the idle seek is reversed when the magnetic head is in a range from the 0th cylinder to the 500th cylinder and in a range from the 7500th cylinder to the 8000th cylinder on the magnetic disk medium.

* * * * *

UNITED STATES PATENT AND TRADEMARK OFFICE
CERTIFICATE OF CORRECTION

| | | |
|---|---|---|
| PATENT NO. | : 7,375,917 B1 | |
| APPLICATION NO. | : 09/517176 | |
| DATED | : May 20, 2008 | |
| INVENTOR(S) | : Fujii et al. | |

It is certified that error appears in the above-identified patent and that said Letters Patent is hereby corrected as shown below:

Title Page Item (73), should read as follows:

(73) Assignee: Hitachi Global Storage Technologies Japan Ltd.,
Kanagawa (JP)

Signed and Sealed this
Nineteenth Day of July, 2011

David J. Kappos
*Director of the United States Patent and Trademark Office*